United States Patent [19]

Hashimoto et al.

[11] Patent Number: 4,590,053
[45] Date of Patent: May 20, 1986

[54] METHOD FOR PRODUCING α-FORM SILICON NITRIDE FINE POWDERS

[75] Inventors: Tadanori Hashimoto, Takatsuki; Kazuhiko Nakano, Katano; Masaaki Hama, Toyonaka; Norio Matsuda, Ibaraki, all of Japan

[73] Assignee: Sumitomo Chemical Company, Limited, Osaka, Japan

[21] Appl. No.: 747,851

[22] Filed: Jun. 24, 1985

Related U.S. Application Data

[63] Continuation-in-part of Ser. No. 629,113, Jul. 9, 1984, abandoned.

[30] Foreign Application Priority Data

Jul. 14, 1983 [JP] Japan ................ 58-128897
Sep. 21, 1984 [JP] Japan ................ 59-199132

[51] Int. Cl.$^4$ ............................. C01B 21/068
[52] U.S. Cl. ............................. 423/344; 423/406
[58] Field of Search ..................... 423/344, 406

[56] References Cited

U.S. PATENT DOCUMENTS

| | | | |
|---|---|---|---|
| 4,368,180 | 1/1983 | Inoue et al. | 423/344 |
| 4,428,916 | 1/1984 | Komeya et al. | 423/344 |
| 4,514,370 | 4/1985 | Inoue et al. | 423/344 |

FOREIGN PATENT DOCUMENTS

| | | | |
|---|---|---|---|
| 080050 | 6/1983 | European Pat. Off. | 344/ |
| 2818545 | 9/1978 | Fed. Rep. of Germany | 423/344 |
| 51-48800 | 4/1976 | Japan | 423/344 |
| 53-133600 | 11/1978 | Japan . | |
| 23917 | 8/1979 | Japan . | |
| 54-120298 | 9/1979 | Japan | 423/344 |
| 54-120299 | 9/1979 | Japan | 423/344 |
| 58-091005 | 5/1983 | Japan . | |
| 59-107976 | 6/1984 | Japan . | |

OTHER PUBLICATIONS

Journal of the Ceramic Association, Japan, 85 [11], 537–542 (1977), with English Abstract.
J. Am. Ceram. Soc., 65 (12), C-205 (1982).
Journal of Materials Science 10 (1975), pp. 1243–1246.

*Primary Examiner*—Jack Cooper
*Attorney, Agent, or Firm*—Stevens, Davis, Miller & Mosher

[57] ABSTRACT

A method for producing a high-grade fine powder of α-form silicon nitride (α-$Si_3N_4$) for use as sintered bodies excellent in heat-stability and mechanical strength which comprises heat-treating, in an atmosphere containing nitrogen, a mixture prepared by adding additive: a mixture of at least one of Mg, Ca, and compounds thereof with 0.01–1 part by weight of silicon nitride powder, in a total amount of 0.001–0.1 part by weight calculated in terms of elemental weight(s) of Mg or/and Ca, and 1 part or less by weight of silicon nitride powder, to 1 part by weight of silicon oxide powder and 0.4–4 parts by weight of carbon powder.

4 Claims, No Drawings

METHOD FOR PRODUCING α-FORM SILICON NITRIDE FINE POWDERS

The present application is a continuation-in-part of application Ser. No. 629,113 filed July 9, 1984, now abandoned.

The present invention relates to a method for producing a fine powder of α-form silicon nitride (α-Si$_3$N$_4$), and provides a method for producing a high-quality fine powder of α-form silicon nitride in good yields.

Silicon nitride is superior in thermal resistance and high-temperature strength, and its sintered body is expected as a high-strength heat-resisting material or an abrasion-resisting material having precise dimensions, for example, as a material which makes it possible to realize an increased maximum service temperature, reduced weight and improved efficiency of heat engines such as diesel engines, gas turbines, etc. These thermal and mechanical properties of the sintered body depend largely upon properties of a material for the sintered body, and there is a need, for a high-quality fine powder of α-form silicon nitride having nearly spherical particle shapes for not more than 1 μm in diameter and a sharp particle size distribution.

The well-known synthetic methods for silicon nitride are as follows:

(i) Direct nitriding of metallic silicon, $$3Si + 2N_2 \rightarrow Si_3N_4$$

(ii) Reduction nitriding of silicon oxide, $$3SiO_2 + 6C + 2N_2 \rightarrow Si_3N_4 + 6CO$$

(iii) Gas-phase synthesis from silane or silicon tetrachloride, etc., $$2SiCl_4 + 16NH_3 \rightarrow Si_3N_4 + 12NH_4Cl$$

$$3SiH_4 + 4NH_3 \rightarrow Si_3N_4 + 12H_2$$

(iv) Thermal decomposition of silicon diimide, silicon tetraamide, etc.

$$3Si(NH)_2 \rightarrow Si_3N_4 + 2NH_3$$

$$3Si(NH_2)_4 \rightarrow Si_3N_4 + 8NH_3$$

But, the method (i) has a drawback in that heat generation at the direct reaction of a metallic silicon powder with nitrogen gas is so violent that the reaction is difficult to control. The methods (iii) and (iv) are featured in that a high-purity fine powder of silicon nitride is easily obtained, but the powder obtained is amorphous and very fine, generally 100 to 200 Å in particle diameter, so that it is not suitable in form for a sintered material. Consequently, this powder is commonly crystallized by further heat-treatment at a temperature of 1,300° to 1,500° C. in a nitrogen gas atmosphere, but these method are disadvantageous in that it is difficult to obtain a powder having a high proportion of α-form silicon nitride, and in addition that, since needle-like or rod-like crystals are contained as contaminants in the powder obtained by this crystallization, it is difficult to control the particle shape of the powder. Of the above-cited methods, the method (ii) is useful in industry in that the materials are available at relatively low costs, the reaction operation is relatively easy, the materials used are not liable to cause corrosion of equipment, explosion, etc., and additionally that silicon nitride having a high proportion of α-form silicon nitride is easily obtained. This method, however, involves two problems described below. One problem is that: generally, only particles of several microns (μm) in size are obtained even though carefully selected fine powders of silicon oxide and carbon are used as feed materials, and yet in some cases, said particles contain needle-like or rod-like crystals, so that it is not easy to obtain a uniform fine powder of α-form silicon nitride having nearly spherical particle shapes of not more than 1 μm in diameter. The other problem is that, when the carbon to silicon oxide ratio in the material is low, the conversion to nitride is so low that unreacted silicon oxide remains. These problems become noticeable with an increase in the particle diameter of the silicon oxide powder used and form a great hindrance to obtaining a fine powder of α-form silicon nitride at a lower cost.

In order to eliminate these drawbacks, there are proposed a method in which the conversion to nitride is elevated by adding an oxide of iron, manganese, magnesium or the like as a catalyst (refer to Yogyo Kyokai-shi, Vol. 85[II], 537–542, 1977) and a method in which a silicon nitride powder is added to produce its seed effect (Japanese Patent Publication No. 23917/1979, Japanese Patent Application Laid-Open No. 91005/1983, Collection of Lectures on the 1st Symposium of Basic Technology for Future Industries, pp. 27–46, Nov. 11, 1983). In the former method, however, the formed silicon nitride has generally a particle diameter of several microns (μm) and moreover contains needle-like or rod-like crystals, although this method is reported to increase the conversion to nitride even though a silicon oxide powder of large particle diameter and a low carbon to silicon oxide ratio are used. This tendency becomes more remarkable with an increase in the particle size of silicon oxide used as raw material. In other words, this method, though promoting the nitriding, has a problem in controlling the diameter and shape of silicon nitride particles formed, being little effective in achieving an object of producing spherical fine powders. That is, the addition of iron oxide, manganese dioxide, cobalt oxide or chromium oxide, each being reported in the above documents to promote the conversion to silicon nitride, tends to form silicon carbide incidentally and the addition of vanadium pentoxide tends to form β-silicon nitride. Also, the latter method is reported to have the effect of promoting the nitridation and the deposition of the formed silicon nitride because of the added silicon nitride powder acting as a nucleus. But this effect are hardly obtained when the carbon to silicon oxide ratio is small and the reaction temperature is as low as 1,400° C. Further, when the particle diameter of silicon oxide used is at least 1 μm, even though a large carbon to silicon oxide ratio and a high reaction temperature are used, the resulting silicon nitride powder is not sufficiently fine, non-uniform in particle shape and contains needle-like and rod-like crystals. In other words, this method has little effect when the silicon oxide used as a material has a particle diameter of at least 1 μm. In the synthesis of silicon nitride by reduction-nitriding of silicon oxide, the cost of the raw material silicon oxide occupies a large percentage of the manufacturing cost of silicon nitride. The cost of silicon oxide depends upon its particle diameter, etc., and silicon oxide of less than 1 μm, for instance, from 20 to 40 mμ, in particle diameter is relatively expensive. For lowering the manufacturing cost, therefore, it is desired to use a coarse and cheap silicon oxide having a particle diameter of not less than 1 μm as far as possible.

An object of the present invention is to provide an improved method for reduction-nitriding of silicon oxide.

Another object of the present invention is to provide a method for producing a fine powder of α-form silicon nitride with a high nitring conversion.

A further object of the present invention is to provide a method for producing a fine powder of α-form silicon nitride having nearly spherical particle shapes of 0.3–1.0 μm in average diameter.

A still further object of the present invention is to provide a method for producing a fine powder of α-form silicon nitride, wherein the reduction-nitriding can smoothly be advanced even though a coarse and cheap silicon oxide is used.

The present inventors made an extensive study and as a result, found that, in the above reduction-nitriding of silicon oxide, when at least one of magnesium, calcium and compounds thereof as well as a silicon nitride powder are added, independently of the particle diameter of the silicon oxide used, a uniform fine powder of α-form silicon nitride having a high nitride purity, and nearly sperical particle shapes can be obtained in good yields.

Moreover, when the added silicon nitride has a BET specific surface area of 15 to 50 m$^2$/g and substantially α-crystal form, a uniform fine powder of α-form silicon nitride nearly spherical in particle shape with an average particle diameter of 0.3 to 1.0 μm can be obtained in good yields even from coarse particles of silicon oxide of 1 μm or more in average diameter.

The present invention provides a method for producing a fine powder of α-form silicon nitride, characterized in that 0.001 to 0.1 part in terms of the total element weight, of at least one of Mg, Ca and their compounds and 0.01–1 part by weight of silicon nitride powder are mixed with 1 part by weight of a silicon oxide powder and 0.4–4 parts by weight of a carbon powder and this mixture is heat-treated in a nitrogen-containing atmosphere to reduce and convert the silicon oxide into silicon nitride, and a method for producing fine powders of α-form silicon nitride of 0.3 to 1.0 μm in average particle diameter, characterized in that 0.001 to 0.1 part, in terms of the total element weight, of at least one of Mg, Ca and their compounds and 0.01–1 part by weight of a silicon nitride powder having a BET specific surface area of 15 to 50 m$^2$/g and being composed substantially of α-form crystals are mixed with 1 part by weight of silicon oxide powder of 1 to 100 μm in average particle diameter and 0.4–4 parts by weight of a carbon powder are mixed together and heat-treated at 1,450°–1,550° C. in a nitrogen-containing atmosphere to reduce and convert the silicon oxide of 1 to 100 μm in average particle diameter into silicon nitride.

The present invention is described in detail hereinafter.

The silicon oxide powder is desired to have an average particle diameter of up to 100 μm and be as pure as possible. Fine silicon oxide powders of less than 1 μm in average particle diameter are nearly 10 times as expensive as those of 1 to 100 μm in average particle diameter, and hence a fine powder of α-form silicon nitride cannot be produced therefrom at a lower cost. Consequently, coarse silicon oxide powders of 1 to 100 μm in average particle diameter are preferable from the industrial point of view. When a silicon oxide powder larger than 100 μm in average particle diameter is used, it is necessary, in order to obtain a uniform mixture of the silicon oxide powder with a carbon powder and with other materials, that the mixing in a ball mill or the like be prolonged, thereby enhancing the grinding effect, or that the silicon oxide powder is ground in advance in a ball mill, vibrating mill or the like to particle sizes smaller than 100 μm. Impurities such as B, Al and Zn compounds, when contained in the silicon oxide powder, will act to inhibit the reduction-nitriding, while impurities such as V, Nb, Ta, Cr, Mo, W, Mn, Fe, Co, Ni and Cu compounds will act to form SiC and make needle-like silicon nitride crystals liable to form. Therefore the raw material silicon oxide powder is desired to contain these impurities as little as possible.

Thus it is desirable to use silicon oxide not containing more than 0.3% by weight of these impurities calculated in terms of the total amount of their metal elements. Such silicon oxide powders include, for example, silicic anhydride, quartz, cristobalite, quartz glass and silica gel powders. The most favorable of these is a naturally occurring quartz powder in that it is available cheaply.

Also the carbon powder to use is similarly described not to contain more than 0.3% by weight of these impurities calculated in terms of the total amount of their metal elements. Typical examples of such carbon powders are acetylene black and furnace black. Acceptable particle sizes thereof are several mμ and more. In view of handling, it is advantageous to use granulated or pressed carbon particles of about 0.3 to 1.5 mm in size, provided that the particles are pulverizable during the mixing.

Suitable fine powders of silicon nitride for use as seeds are of α-form having a BET specific surface area of 15 to 50 m$^2$/g and containing at least 90% of the α-phase.

When the BET specific surface area thereof is less than 15 m$^2$/g, the produced α-form silicon nitride will have an average particle diameter of larger than 1 μm and be contaminated with needle-like or rod-like crystals, even if the seeds are fine particles having an average diameter of up to 1 μm. This phenomenon is remarkable in particular when coarse particles of silicon oxide larger than 1 μm in diameter are used as raw material.

When the BET specific surface area exceeds 50 m$^2$/g, the rise in the seed effect will no longer be observed. Additionally, this will make the production difficult and result in worse economy and industrial disadvantages. Accordingly, the BET specific surface area is desirably up to 50 m$^2$/g, preferably from 15 to 30 m$^2$/g.

Moreover it is desirable to use a fine powder of silicon nitride in which the α-phase content is at least 90% because the use of a silicon nitride powder containing less than 90% of the α-phase and more than 10% of the β-phase will lower the α-phase content in the produced silicon nitride and cause the contamination with needle-like or rod-like particles.

The fine powder of α-Si$_3$N$_4$ to add is generally up to 1 μm, preferably from 0.3 to 0.8 μm, in average particle diameter.

The fine powder of α-Si3N4 produced by the method of the present invention has a specific surface area considerably smaller than 15 m$^2$/g even when the average particle diameter of the powder is from 0.3 to 0.5 μm.

Therefore it is usually desirable to subject this powder to milling with a grinder such as a vibrating mill exerting a powerful impact destructive force (impact 3-15 G) until the specific surface area becomes 15 m²/g or more, thereby giving the intended final product. The milling is desirably carried out in an atmosphere of inert gas such as nitrogen or argon for preventing the oxidation of the silicon nitride powder. Particle diameters of the silicon nitride powder of up to 1 μm in particle diameter are scarcely varied during the milling with such a grinder. Hence the increase in the specific surface area is considered to be a result of roughening the particle surface of the silicon nitride.

The specific surface area is little increased by grinding for 200 hours or so with the commonly used ball mill because of its low destructive force.

In the milling of seed silicon nitride, contamination thereof with some of metals such as Al, Fe, Ni and W may occur depending upon constructing materials of the vibrating mill or the like employed. If such a contaminated fine powder of silicon nitride is used, the seed effect will not be notable and needle-like crystals or rod-like particles will mix in the product silicon nitride. In such a case, the fine powder of $\alpha$-$Si_3N_4$ ground with a vibrating mill or the like to give a BET specific surface area of 15 to 50 m²/g is desired to be washed with a hydrofluoric acid-containing mineral acid before use.

Since seed particles sometimes may be covered with oxides by the milling, the above wash is desirable also for the purpose of removing the oxides.

Suitable magnesium and its compounds for use in the invention include, for example, metallic magnesium, magnesium oxide, magnesium hydroxide, magnesium carbonate, basic magnesium carbonate, magnesium chloride, magnesium nitrate, magnesium sulfate, magnesium isopropoxide and magnesium nitride. Suitable calcium and its compounds include, for example, metallic calcium, calcium oxide, calcium hydroxide, calcium peroxide, calcium carbonate, calcium fluoride, calcium chloride, calcium nitrate, calcium sulfate, calcium isopropoxide, calcium nitride and calcium carbide. Generally, a silicon oxide powder, a carbon powder, a silicon nitride powder, metallic elements (i.e. magnesium, calcium) and their compounds, which are used as materials, are mixed together, in many cases, in the presence of water by means of a wet-type ball mill so as to make the mixing more uniform. It is therefore preferable to use water-soluble compounds of said metallic elements to using the elements themselves. Also, the substances given above may be added alone or in mixtures of two or more of them.

In the present invention, unreacted $SiO_2$ remains when the amount of carbon powder added is less than 0.4 part by weight based on 1 part by weight of a silicon oxide powder, that is, in the reduction-nitriding equation, $3SiO_2 + 6C + 2N_2 \rightarrow Si_3N_4 + 6CO$, said amount is less than the equivalent weight. In contrast, when said amount is more than 4 parts by weight, more $\beta$-form silicon nitride are produced and in addition the yield decreases. The amount of carbon powder added is, therefore, preferably 0.4 to 4 parts by weight, particularly preferably 0.5 to 1.2 parts by weight.

The silicon nitride powder is added preferably in an amount of 0.01 to 1 part by weight based on 1 part by weight of the silicon oxide powder. When the amount of silicon nitride powder is less than 0.01 part by weight, the effect of the powder to act as nuclei on silicon nitride formation is hardly noticed, a uniform $\alpha$-$Si_3N_4$ powder of more than 1 μm in particle diameter being obtained, and in some cases, said $\alpha$-$Si_3N_4$ powder is contaminated with needle-like or rod-like crystals.

Contrary to this, when said amount is larger than 1 part by weight, the $\alpha$-$Si_3N_4$ powder obtained contains the added $\alpha$-$Si_3N_4$ in larger amounts than the freshly formed $\alpha$-$Si_3N_4$, thereby resulting in that, characteristics of the added $\alpha$-$Si_3N_4$ rather undesirably appear. From the practical point of view, the addition of a minimum amount of $\alpha$-$Si_3N_4$ powder is better for high production efficiency, and therefore, it is desirable to add preferably 0.01 to 0.1 part by weight based on 1 part by weight of the silicon oxide powder.

The amount of the foregoing metallic element (Mg or Ca) is desirably within a range of 0.001 to 0.1 part by weight, as converted to the total weight of magnesium or/and calcium elements, based on 1 part by weight of the silicon oxide powder. Amounts of the element less than 0.001 part by weight have little effects of promoting the nitriding and of forming the fine powder of $\alpha$-$Si_3N_4$. On the contrary when the amount is more than 0.1 part by weight, the formed $\alpha$-$Si_3N_4$ contains large amounts of Mg and/or Ca, being undesirable for sintered materials. Preferably, the amount is within a range of 0.001 to 0.03 part by weight.

In the present invention, the above raw material and additives can be uniformly mixed together by any known method and there is no particular restriction on the mixing method. However, wet mixing is preferable, wherein powders of silicon oxide, carbon, at least one of Mg metal, Ca metal and compounds of these metals, and silicon nitride are mixed together in the presence of water.

While the mixing can be carried out by means of a ball mill, kneader for ceramics or the like, the constructing materials of the mixer need to be selected so as not to contaminate the ground product with impurities such as Fe and Al which are harmful to the reaction. In the case of a ball mill, it is generally desirable to carry out the mixing in a plastic pot using plastic coated balls, quartz glass balls or silicon nitride balls.

Since carbon powders are hundreds of mμ in particle size, low in specific gravity and therefore difficult to handle, the carbon powder to use is preferably once granulated or pressed into particles of about from 0.3 to 1.5 mm in diameter, and then mixed with other feed materials by a method mentioned above.

The product of the wet mixing is then subjected to drying, which is preferably carried out by a means such as a spray dryer or a rotary evaporator so as to prevent the separation of powders of silicon oxide, carbon and other powders from one another on account of the difference in specific gravity.

The mixture thus obtained is heat-treated in a nitrogen-containing atmosphere to reduce the silicon oxide and form the nitride. For the nitrogen-containing atmosphere, a reaction gas such as $N_2$, $NH_3$, $N_2$—$H_2$ or $N_2$—$Ar$ may be used. The heat-treatment temperature may be selected from the range of 1,400° to 1,600° C., preferably 1,450° to 1,550° C. At temperatures lower than 1,400° C., a long reaction time is required in order to allow the nitriding to produced sufficiently, while temperatures more than 1,600° C. undersirably increases the formation of SiC.

Thus, it is best suited, from the economical point of view as well, to maintain the reaction system at a temperature of 1,450° to 1,550° C. for a period of 2 to 6 hours.

Further, for the purpose of removing the residual carbon, it is desirable to carry out heat-treatment in an oxidative atmosphere, in the temperature range generally of 600° to 800° C. for a period of 1 to 4 hours.

As described above, the present invention includes adding the additive comprising a silicon nitride powder, the foregoing metallic element (Mg and/or Ca) or its compound to a silicon oxide powder and a carbon powder, mixing these substances, and heat-treating the resulting mixture in a nitrogen-containing atmosphere. By this method, not only the catalytic effect of said metallic element or its compound on the reduction.nitriding, but also the fine powder-forming effect owing to the reaction of this substance with the silicon nitride powder are developed. In addition, a fine powder of α-form silicon nitride having high contents of nitrogen and α-$Si_3N_4$ and nearly spherical particle shapes can be obtained, which was so far difficult to obtain, when a silicon oxide powder having relatively large particle diameters was used, by merely adding said metallic element, its compound or a silicon nitride powder alone. Furthermore, when the silicon nitride powder added has a BET specific surface area of 15 to 50 $m^2/g$ and is composed substantially of α-form crystals, for instance, at least 90% of the α-phase, a fine powder of α-form silicon nitride which has high contents of nitrogen and α-$Si_3N_4$ and consists of nearly spherical particles of 0.3 to 1.0 μm in average diameter can be obtained even from coarse particles of silicon oxide having an average diameter of at least 1 μm.

The fine powder of α-$Si_3N_4$ obtained according to the present invention has the property of being well dispersed in water and in an alcoholic solvent such as isopropyl alcohol.

According to the present invention, the production of a powdery material for silicon nitride sintered products superior in thermal resistance and high-temperature strength can be carried out more advantageously in industry.

Next, the present invention will be illustrated more specifically with reference to the following examples, but the present invention is not to be interpreted as being limited thereto.

EXAMPLE 1

The following materials were used: a commercially available quartz sand powder (average particle diameter, 6 μm; BET specific surface area, 1.2 $m^2/g$) as silicon oxide powder commercially available pressed acetylene black as carbon powder, $Mg(NO_3)_2 \cdot 6H_2O$ as reaction promoter, α-$Si_3N_4$ powder (average particle diameter 0.5 μm, BET specific surface area 17 $m^2/g$, and α-phase content 96%) as silicon nitride seeds.

These powders in the different proportions shown in Table 1 were wet-mixed in each run for 2 hours in the presence of water by means of a plastic pot ball mill using plastic-coated balls. The obtained mixtures in slurry form were dried by heating each in a rotary evaporator under reduce pressure while rotating it.

The dried mixtures were placed each in a graphite container, and heat-treated at 1,500° C. or 1,550° C. for a period of 4 to 6 hours in a stream of $N_2$ gas to reduce and convert the $SiO_2$ into silicon nitride. The resulting powders were further heat-treated in the air at 700° C. for 4 hours to burn up and remove the unreacted carbon. Thus fine powders of $Si_3N_4$ were obtained.

The average particle diameter of each powder obtained, the N content therein and the α-$Si_3N_4$ content therein determined from an X-ray diffraction pattern thereof are shown in Table 1.

EXAMPLE 2

Two portions of the silicon nitride powder prepared in Example 1 which was found to have an average particle diameter of 0.5 μm, BET specific surface area of 7 $m^2/g$ and α-phase content of 98% were wet-milled for 75 hours and 100 hours, respectively, in isopropyl alcohol as dispersion medium by means of a vibrating mill employing a silicon nitride pot and silicon nitride balls. The silicon nitride powder wet-milled for 75 hours (this powder was designated as silicon nitride powder A) was found to have an average particle diameter of 0.5 μm, BET specific surface area of 17 $m^2/g$ and α-phase content of 96%. The other silicon nitride powder, wet-milled for 100 hours (this powder was designated as silicon nitride powder B) was found to have an average particle diameter of 0.5 μm, BET specific surface area of 21 $m^2/g$ and α-phase content of 96%.

According to the procedure of Example 1, $Si_3N_4$ powders were prepared by using silicon nitride powders A and B, respectively. The average particle diameter of each powder prepared and the N content and α-$Si_3N_4$ content therein are shown in Table 1.

EXAMPLE 3

Silicon nitride powders prepared in Examples 1 and 2 were used as seed powders. The powder of Example 1 (designated as silicon nitride powder C) was found to have an average particle diameter of 0.5 μm, BET specific surface area of 7 $m^2/g$ and α-phase content of 98%. The powder of Example 2 (designated as silicon nitride powder D) was found to have an average particle diameter of 0.4 μm, BET specific surface area of 9 $m^2/g$ and α-phase content of 99%.

According to the procedure of Example 1, $Si_3N_4$ powders were prepared by using silicon nitride powders C and D, respectively. The average particle diameter of each powder obtained and the N content and α-$Si_3N_4$ content therein are shown in Table 1. Dissimilarly to Examples 1 and 2, the silicon nitride powders obtained in this Example were large in particle diameter and contaminated with needle-like crystals.

EXAMPLE 4

A silicon nitride powder prepared in Example 1 which was found to have an average particle diameter of 0.5 μm, BET specific surface area of 7 $m^2/g$ and α-phase content of 98% was wet-milled for 100 hours in isopropyl alcohol by means of a vibrating mill employing a highly aluminous pot and silicon nitride balls, giving a powder modified in specific surface area.

The powder was added to a mixture of 50% hydrofluoric acid and 70% nitric acid (1:5 in volume ratio) to a concentration of 50 g/l. After 1 hour's stirring of the suspension, the suspended solid was collected, washed and dried. The resulting powder (designated as silicon nitride powder E) was found to have an average particle diameter of 0.5 μm, BET specific surface area of 22 $m^2/g$, α-phase content of 96% and Al content of 0.02%.

According to the procedure of Example 1, $Si_3N_4$ powders were prepared by using silicon nitride powder as seeds. The average particle diameter of each powder obtained and the N content and α-$Si_3N_4$ content therein are shown in Table 1.

EXAMPLE 5

According to the procedure of Example 1, $Si_3N_4$ powders were prepared by using a commercial silicic anhydride as silicon oxide powder (average particle diameter 17 μm, BET specific surface area 0.3 m²/g), granular acetylene black as carbon powder, $Mg(NO_3)_2.6H_2O$ as reaction promoter and silicon nitride powder B as seeds.

The obtained powders were measured for average particle diameter, N content and α-$Si_3N_4$ content. Results of the measurements are shown in Table 1.

EXAMPLE 6

According to the procedure of Example 1, α-$Si_3N_4$ powders were prepared by feeding the same materials as used in Example 1 except that $Mg(OH)_2$ was used as reaction promoter. The obtained powders were measured for average particle diameter, N content and α-$Si_3N_4$ content. Results of the measurements are shown in Table 1.

COMPARATIVE EXAMPLE 1

According to the procedure of Example 1, $Si_3N_4$ powders were prepared by feeding the same powders as used in Example 1 except that no silicon nitride powder seed was added in a first case, no $Mg(NO_3)_2.6H_2O$ was added in a second case, and none of them were added in a third case. The average particle diameter, particle shape, N content and α-$Si_3N_4$ content measured on each powder obtained are shown in Table 1.

EXAMPLE 7

According to the procedure of Example 1, $Si_3N_4$ powders were prepared by feeding the same powders as used in Example 1 but using $MgCO_3$, $(CH_3CO_2)_2Mg$, $MgO$, $MgCl_2.6H_2$, $CaCO_3$, $Ca(OH)_2$, $CaO$ and $CaCl_2.6H_2O$ as respective reaction promoters. The average particle diameter, N content and α-$Si_3N_4$ content measured on each powder obtained are shown in Table 2.

TABLE 1

| Run No. | Feed materials | | | | Composition of feed (part by weight) | | | | Reaction conditions | | | Characteristics of product | | | |
|---|---|---|---|---|---|---|---|---|---|---|---|---|---|---|---|
| | $SiO_2$ | C | Mg | $Si_3N_4$ | $SiO_2$ | C | Mg | $Si_3N_4$ | Temperature (°C.) | Period (hr.) | Atmosphere | Particle shape | Average particle diameter (μm) | N content (%) | α-phase content (%) |
| Example 1 | | | | | | | | | | | | | | | |
| 1 | Quartz | Acetylene black press | $Mg(NO_3)_2$ | Commercial $Si_3N_4$ | 1 | 0.6 | 0.01 | 0.1 | 1500 | 6 | $N_2$ | Spherical | 0.5 | 37.4 | 98 |
| 2 | " | Acetylene black press | " | Commercial $Si_3N_4$ | 1 | 0.6 | 0.01 | 0.05 | 1500 | 6 | $N_2$ | " | 0.5 | 37.6 | 99 |
| 3 | " | Acetylene black press | " | Commercial $Si_3N_4$ | 1 | 0.8 | 0.005 | 0.1 | 1550 | 5 | $N_2$ | " | 0.5 | 37.4 | 98 |
| Example 2 | | | | | | | | | | | | | | | |
| 4 | " | Acetylene black press | " | $Si_3N_4$A | 1 | 0.6 | 0.01 | 0.1 | 1550 | 6 | $N_2$ | " | 0.5 | 37.5 | 98 |
| 5 | " | Acetylene black press | " | " | 1 | 0.8 | 0.005 | 0.05 | 1550 | 6 | $N_2$ | " | 0.5 | 37.6 | 99 |
| 6 | " | Acetylene black press | " | $Si_3N_4$B | 1 | 0.6 | 0.005 | 0.1 | 1500 | 6 | $N_2$ | " | 0.4 | 37.8 | 98 |
| 7 | " | Acetylene black press | " | " | 1 | 0.8 | 0.005 | 0.1 | 1450 | 5 | $N_2$ | " | 0.3 | 37.4 | 98 |
| 8 | " | Acetylene black press | " | " | 1 | 0.8 | 0.01 | 0.05 | 1550 | 6 | $N_2$ | " | 0.4 | 37.7 | 99 |
| Example 3 | | | | | | | | | | | | | | | |
| 9 | " | Acetylene black press | " | $Si_3N_4$C | 1 | 0.6 | 0.01 | 0.1 | 1500 | 6 | $N_2$ | Contaminated with needle-like crystals | 1.5 | 37.8 | 98 |
| 10 | " | Acetylene black press | " | $Si_3N_4$D | 1 | 0.8 | 0.01 | 0.1 | 1500 | 6 | $N_2$ | Contaminated with needle-like crystals | 1.2 | 37.5 | 98 |
| Example 4 | | | | | | | | | | | | | | | |
| 11 | " | Acetylene black press | " | $Si_3N_4$E | 1 | 0.6 | 0.01 | 0.1 | 1500 | 6 | $N_2$ | Spherical | 0.4 | 37.7 | 98 |

TABLE 1-continued

| Run No. | Feed materials SiO₂ | C | Mg | Si₃N₄ | Composition of feed (part by weight) SiO₂ | C | Mg | Si₃N₄ | Reaction conditions Temperature (°C.) | Period (hr.) | Atmosphere | Particle shape | Average particle diameter (μm) | N content (%) | α-phase content (%) |
|---|---|---|---|---|---|---|---|---|---|---|---|---|---|---|---|
| 12 | " | Acetylene black press | " | " | 1 | 0.8 | 0.005 | 0.05 | 1550 | 4 | N₂ | " | 0.4 | 37.8 | 99 |
| Example 5 | | | | | | | | | | | | | | | |
| 13 | Silicic anhydride | Acetylene black press | " | Si₃N₄B | 1 | 0.6 | 0.01 | 0.1 | 1500 | 6 | N₂ | " | 0.4 | 37.6 | 98 |
| 14 | Silicic anhydride | Acetylene black press | " | " | 1 | 0.6 | 0.005 | 0.1 | 1450 | 6 | N₂ | " | 0.4 | 37.3 | 99 |
| 15 | Silicic anhydride | Acetylene black press | " | " | 1 | 0.8 | 0.01 | 0.1 | 1550 | 5 | N₂ | " | 0.4 | 37.8 | 98 |
| Example 6 | | | | | | | | | | | | | | | |
| 16 | Quartz | Acetylene black press | Mg(OH)₂ | Commercial Si₃N₄ | 1 | 0.6 | 0.005 | 0.05 | 1550 | 6 | N₂ | " | 0.5 | 37.6 | 98 |
| 17 | " | Acetylene black press | " | Commercial Si₃N₄ | 1 | 0.8 | 0.005 | 0.1 | 1500 | 6 | N₂ | " | 0.5 | 37.5 | 98 |
| Comparative Example 1 | | | | | | | | | | | | | | | |
| 18 | " | Acetylene black press | — | Commercial Si₃N₄ | 1 | 0.6 | — | 0.1 | 1500 | 6 | N₂ | Mainly needle-like crystals | 0.6 | 37.1 | 98 |
| 19 | " | Acetylene black press | — | Commercial Si₃N₄ | 1 | 2.0 | — | 0.1 | 1550 | 6 | N₂ | Mainly needle-like crystals | 0.5 | 36.8 | 98 |
| 20 | " | Acetylene black press | Mg(NO₃)₂ | — | 1 | 0.6 | 0.01 | — | 1550 | 6 | N₂ | Rod-like particles | 3.0 | 37.9 | 98 |
| 21 | " | Acetylene black press | " | — | 1 | 2.0 | 0.01 | — | 1500 | 6 | N₂ | Rod-like particles | 2.5 | 37.8 | 98 |
| 22 | " | Acetylene black press | — | — | 1 | 2.0 | — | — | 1500 | 6 | N₂ | Contaminated with needle-like crystals | 3.5 | 30.5 | — |

TABLE 2

| Run No. | Composition of feed (part by weight) SiO₂ | C | α-Si₃N₄ | Reaction promoter Compound | Amount added | Reaction conditions Temperature (°C.) | Period (hr.) | Atmosphere | Average particle diameter (μm) | N content (%) | α-phase content (%) |
|---|---|---|---|---|---|---|---|---|---|---|---|
| Example 7  23 | 1 | 0.8 | 0.1 | MgCO₃ | 0.01 | 1,500 | 6 | N₂ | 0.5 | 37.4 | 98 |
| 24 | 1 | 0.8 | 0.1 | (CH₃CO₂)₂Mg | 0.01 | 1,500 | 6 | N₂ | 0.4 | 37.5 | 98 |
| 25 | 1 | 0.8 | 0.1 | MgO | 0.01 | 1,500 | 6 | N₂ | 0.5 | 37.4 | 98 |
| 26 | 1 | 0.8 | 0.1 | MgCl₂.6H₂O | 0.01 | 1,500 | 6 | N₂ | 0.4 | 37.6 | 98 |
| 27 | 1 | 0.8 | 0.1 | CaCO₃ | 0.01 | 1,500 | 6 | N₂ | 0.6 | 37.5 | 97 |
| 28 | 1 | 0.8 | 0.1 | Ca(OH)₂ | 0.01 | 1,500 | 6 | N₂ | 0.7 | 37.4 | 98 |
| 29 | 1 | 0.8 | 0.1 | CaO | 0.01 | 1,500 | 6 | N₂ | 0.7 | 37.3 | 97 |
| 30 | 1 | 0.8 | 0.1 | CaCl₂.6H₂O | 0.01 | 1,500 | 6 | N₂ | 0.5 | 37.6 | 97 |

What is claimed is:

1. A method for producing a fine powder of α-form silicon nitride of nearly spherical shape having an average particle diameter of 0.3 to 1.0 μm, and essentially uncontaminated with needle-like and rod-like crystals characterized in that an additive which is a mixture of 0.001 to 0.1 part, in terms of the total element weight, of at least one of Mg, Ca and compounds of these metals and 0.01 to 1 part by weight of a silicon nitride powder having a BET specific surface area of 15 to 50 m²/g and being composed substantially of α-form crystals is mixed with 1 part by weight of silicon oxide powder having an average particle diameter of 1 to 100 μm and with 0.4 to 4 parts by weight of a carbon powder and the mixture is heat-treated in a nitrogen-containing atmosphere at a temperature of from 1400° to 1600° C. to reduce and convert the silicon oxide into said fine powder of α-form silicon nitride.

2. The method of claim 1, wherein the additive is a mixture of at least one of Mg and compounds thereof and said silicon nitride powder.

3. The method of claim 2, wherein B-, Al-, Zn, V-, Nb-, Ta-, Cr-, Mo-, W-, Mn-, Fe-, Co-, Ni- and Cu- impurities are not contained in more than 0.3% of the total weight of these metal elements, in each of said silicon oxide powder and said carbon powder.

4. The method of claim 1, wherein B-, Al-, Zn-, V-, Nb-, Ta-, Cr-, Mo-, W-, Mn-, Fe-, Co-, Ni- and Cu- impurities are not contained in more than 0.3% of the total weight of these metal elements, in each of said silicon oxide powder and said carbon powder.

* * * * *